… …

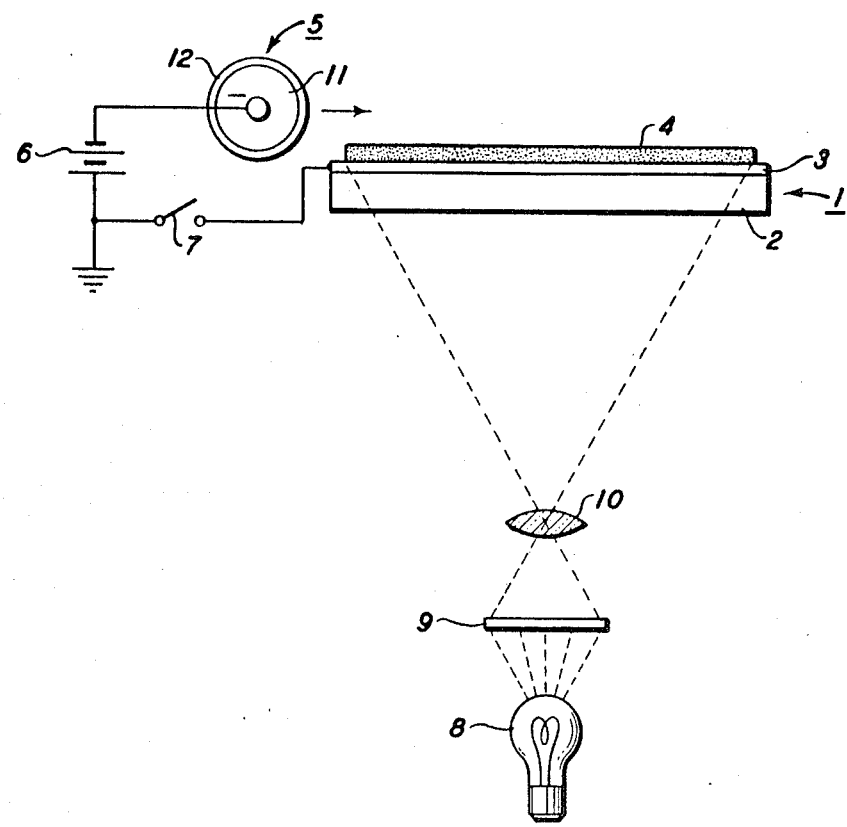

United States Patent Office 3,635,981
Patented Jan. 18, 1972

3,635,981
PHOTOELECTROPHORETIC IMAGING PIGMENT
COMPOSITION AND PROCESS
Lester Weinberger, Brighton, N.Y., assignor to
Xerox Corporation, Rochester, N.Y.
Filed Nov. 1, 1968, Ser. No. 772,596
Int. Cl. C07d *37/00;* C09b *15/00*
U.S. Cl. 260—279
3 Claims

ABSTRACT OF THE DISCLOSURE

A novel composition having the formula:

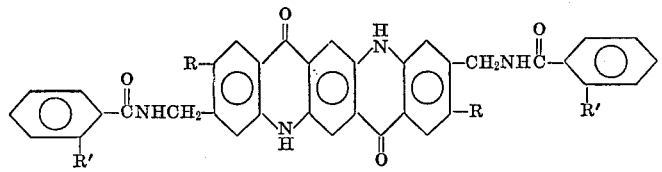

wherein R=$CH_3$, $C_2H_5$, $OCH_3$, $OC_2H_5$ or a halogen and wherein R′=COOH, COOCa/2, $SO_3H$, or $SO_3Ca/2$ is disclosed. Methods of preparing said composition and of using said composition in electrophoretic imaging processes are also disclosed.

BACKGROUND OF THE INVENTION

This invention relates, in general, to novel quinacridone pigments and to methods of preparing same, as well as to the use of said pigments in photoelectrophoretic imaging systems.

There has been recently developed an electrophoretic imaging system capable of producing color images which utilizes single-component photoconductive particles. This process is described in detail and claimed in U.S. Pats. 3,384,565, 3,384,566 and 3,385,488. In such an imaging system, variously colored light absorbing particles are suspended in a non-conductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation, through interaction with one of the electrodes. In a monochromatic system, particles of a single color are used, producing a single colored image equivalent to conventional black-and-while photography. In a polychromatic system, the images are produced in natural color because mixtures of particles of two or more different colors which are each sensitive to light of a specific wavelength or narrow range of wavelengths are used. Particles used in this system must have both intense pure colors and be highly photosensitive. The pigments of the prior art often lack the purity and brilliance of color, the high degree of photosensitivity, and/or the preferred correlation between the peak spectral response and peak photosensitivity necessary for use in such a system.

It is therefore, an object of this invention to provide photoelectrophoretic imaging processes utilizing photosensitive pigment particles which overcome the above-noted deficiencies.

Another object of this invention is to provide highly photosensitive particles for use in electrophoretic imaging systems.

Still another object of this invention is to provide photoelectrophoretic imaging processes capable of producing color images.

Yet another object of this invention is to provide photoelectrophoretic imaging processes utilizing particles having photographic speed and color qualities superior to those of known pigments.

Still another further object of this invention is to provide novel compositions for use in the pigment trade as well as in various imaging processes.

Another object of this invention is to provide methods for the preparation of novel pigment compositions.

SUMMARY OF THE INVENTION

The foregoing objects, and others, are accomplished in accordance with this invention, generally speaking, by providing quinacridone pigments having the general formula:

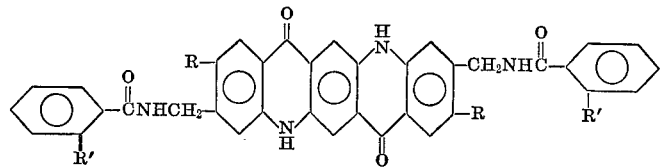

wherein R=CH$_3$, C$_2$H$_5$, OCH$_3$, OC$_2$H$_5$ or a halogen and R'=COOH, COOCa/2, SO$_3$H, SO$_3$Ca/2 and, further, by providing methods for the preparation of said class of pigments as well as by providing photoelectrophoretic imaging processes utilizing this novel class of pigments. This novel class if pigments has been found to have electrically photosensitive or photomigratory characteristics such as to make them especially useful in photoelectrophoretic imaging systems.

While any of the novel class of quinacridones having the above-described general formula may be used in photoelectrophoretic imaging systems, it is preferred to employ those quinacridones wherein R is selected from the group consisting of CH$_3$, C$_2$H$_5$, and mixtures thereof and wherein R'=SO$_3$Ca/2, since these materials have especially pure color and are highly photosensitive for use in electrophoretic imaging processes. The quinacridone pigments of the present invention may have other compositions added thereto to sensitize, enhance, synergize, or otherwise modify its properties.

The class of quinacridone pigments of this invention may be prepared by an suitable method. The compound having the general formula:

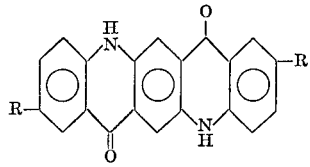

and CH$_2$ and

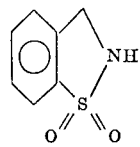

in concentrated H$_2$SO$_4$, heating, pouring the mixture over ice, filtering, and drying.

A preferred method of preparing

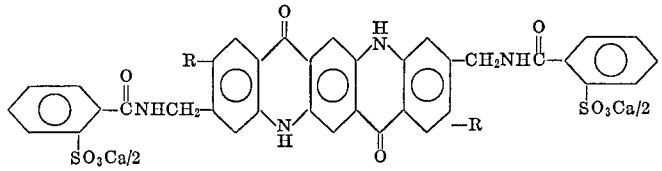

is known and described in U.S. Pat. 3,275,637. The other quinacridone pigments described herein are novel compositions.

The novel quinacridone pigments of the present invention may be prepared by any suitable method. A preferred method of preparing

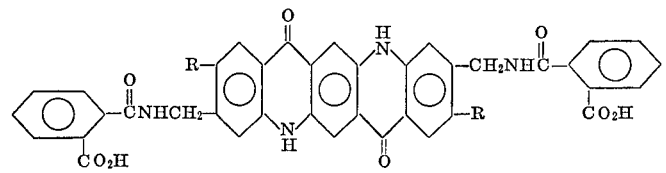

wherein large yields of a substantially pure final product are obtained comprises mixing

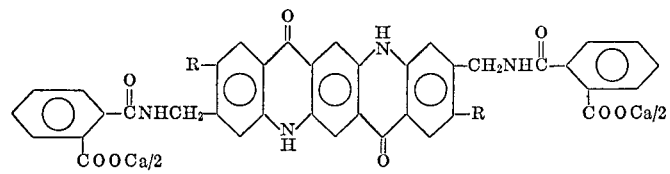

in water and adding CaO.

A preferred method of preparing

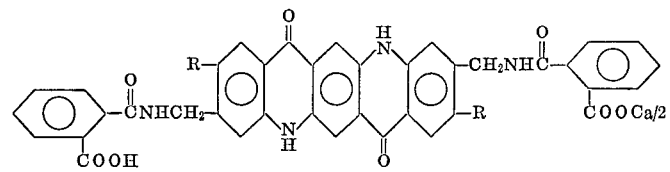

wherein large yields of a substantially pure final product are obtained comprises mixing

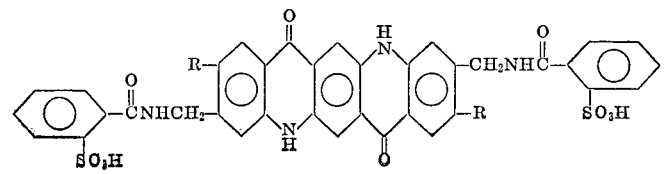

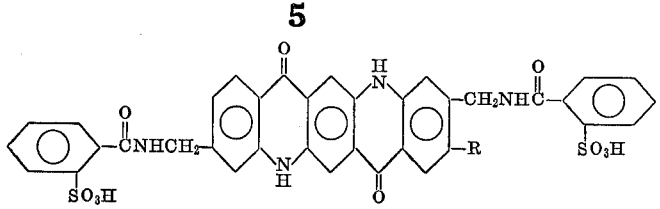

in water and adding CaO.

The use of pigments comprising the novel class of quinacridones of the present invention in photoelectrophoretic imaging processes may be further understood by reference to the figure which shows an exemplary electrophoretic imaging system.

Referring now to the figure, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting" electrode. Coated on the surface of injecting electrode 1 is a thin layer 4 of finely divided photosensitive particles dispersed in an insulating liquid carrier. The term "photosensitive," for the purposes of this application, refers to the properties of a particle which, once attracted to the injecting electrode, will migrate away from it under the influence of an applied electric field when it is exposed to actinic electromagnetic radiation. For a detailed theoretical explanation of the apparent mechanism of operation of the invention, see the above-mentioned U.S. Pats. 3,384,565, 3,384,566 and 3,385,488, the disclosures of which are incorporated herein by reference. Liquid suspension 4 may also contain a sensitizer and/or binder for the pigment particles which is at least partially soluble in the suspending or carrier liquid as will be explained in greater detail below. Adjacent to the liquid suspension 4 is a second electrode 5, hereinafter called the "blocking electrode," which is connected to one side of the potential source 6 through a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a pigment image on the injecting electrode surface which is a duplicate of the original transparency 9. After exposure, the relatively volatile carrier liquid evaporates off, leaving behind the pigment image. This pigment image may then be fixed in place as, for example, by placing a lamination over its top surface or by virtue of a dissolved binder material in the carrier liquid such as paraffin wax or other suitable binder that comes out of solution as the carrier liquid evaporates. About 3% to 6% by weight of paraffin binder in the carrier has been found to produce good results. The carrier liquid itself may be liquefied paraffin wax or other suitable binder. In the alternative, the pigment image remaining on the injecting electrode may be transferred to another surface and fixed thereon. As explained in greater detail below, this system can produce either monochromatic or polychromatic images depending upon the type and number of pigments suspended in the carrier liquid and the color of light to which this suspension is exposed in the process.

Any suitable insulating liquid may be used as the carrier for the pigment particles in the system. Typical carrier liquids are decane, dodecane, N-tetradecane, paraffin, beeswax or other thermoplastic materials, Sohio Odorless Solvent 3440 (a kerosene fraction available from Standard Oil Company of Ohio), and Isopar-G (a branched chain saturated aliphatic hydrocarbon available from Humble Oil Company of New Jersey). Good quality images have been produced with voltages ranging from 300 to 5,000 volts in the apparatus of the figure.

In a moonchromatic system, particles of a single composition are dispersed in the carrier liquid and exposed to a black-and-white image. A single color results, corresponding to conventional black-and-white photography. In a polychromatic system, the particles are selected so that those of different colors respond to different wavelengths in the visible spectrum corresponding to their principal absorption bands. Also, the pigments should be selected so that their spectral response curves do not have substantial overlap, thus allowing for color separation and subtractive multicolor image formation. In a typical multicolor system, the particle dispersion should include cyan colored particles sensitive mainly to red light, magenta particles sensitive mainly to green light and yellow colored particles sensitive mainly to blue light. When mixed together in a carrier liquid, these particles produce a black appearing liquid. When one or more of the particles are caused to migrate from base electrode 11 toward an upper electrode, they leave behind particles which produce a color equivalent to the color of the impinging light. Thus, for example, red light exposure causes the cyan colored pigment to migrate, leaving behind the magenta and yellow pigments which combine to produce red in the final image. In the same manner, blue and green colors are reproduced by removal of yellow and magenta, respectively. When white light impinges upon the mix, all pigments migrate, leaving behind the color of the white or transparent substrate. No exposure leaves behind all pigments which combine to produce a black image. This is an ideal technique of substractive color imaging in that the particles are not only each composed of a single component, but in addition, they perform the dual functions of final image colorant and photosensitive medium.

It has been found that the novel class of quinacridones as discussed above are surprisingly effective when used in either a single or multicolor electrophoretic imaging system. Their good spectral response and high photosensitivity result in dense, brilliant images.

Any suitable different colored photosensitive pigment particles having the desired spectral responses may be used with the novel magenta quinacridone pigments of this invention to form a partial suspension in a carrier liquid for color imaging. From about 2 to about 10 percent pigment by weight have been found to produce good results. The addition of small amounts (generally ranging from 0.5 to 5 mol percent) of electron donors or acceptors to the suspensions may impart significant increases in system photosensitivity.

The following examples further specifically define the present invention with respect to the use of the compositions of the general formula given above in electrophoretic imaging processes. Parts and percentages are by weight unless otherwise indicated. The examples below are intended to illustrate various preferred embodiments of the electrophoretic imaging process of the present invention.

DESCRIPTION OF THE PREFERRED EMBODIMENTS

The following examples are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of baryta paper on its surface. The roller is approximately 2½ inches in diameter and is moved across the plate surface at about 1.45 centimeters per second. The plate employed is roughly 3 inches square and is exposed with a light intensity of 8,000 foot candles as measured on the uncoated NESA glass surface. Unless otherwise indicated, 7 percent by weight of the indicated pigments in each example are suspended in Sohio Odorless Solvent 3440 and the magnitude of the applied potential is 2500 volts. All pigments which have a relatively large particle size as made are ground in a ball mill for 48 hours to reduce their size to provide a more stable dispersion which improves the resolution of the final images. The exposure is made with a 3200° K. lamp through a 0.30 neutral density step wedge filter to measure the sensitivity of the suspensions to white light and then Wratten filters 29, 61 and 47b are individually superimposed over the light source in separate tests to measure the sensitivity of the suspensions to red, green and blue light respectively.

EXAMPLE I

About 0.02 mole of

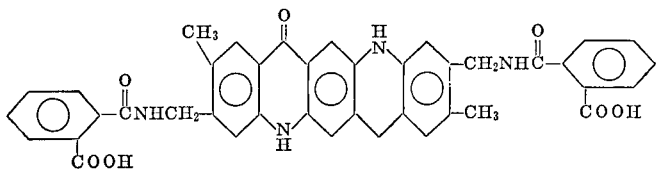

are placed in a 600 ml. glass beaker containing 500 ml. of $H_2O$. About 0.04 moles of CaO are then added. The mixture is stirred for about 1 hour, filtered and dried. The resulting material appears magenta in color and has the formula:

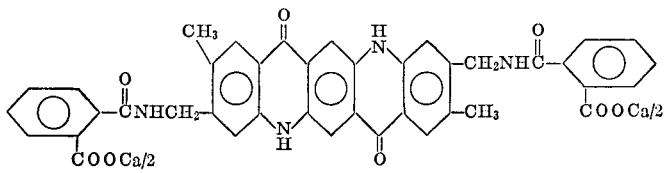

EXAMPLES II–VI

The procedure of Example I is repeated using about 0.002 mole of the following starting materials in place of:

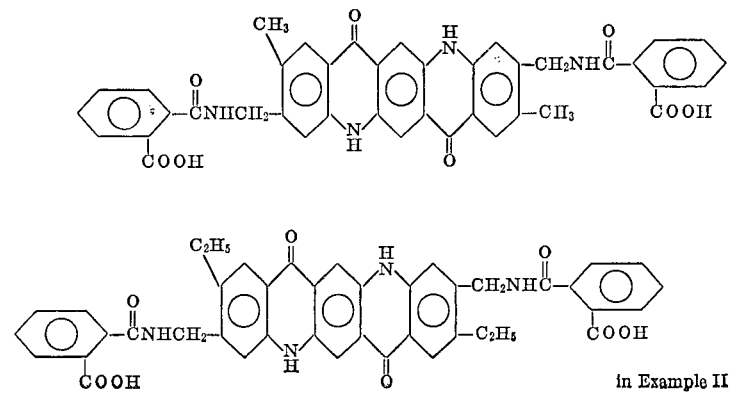

in Example II

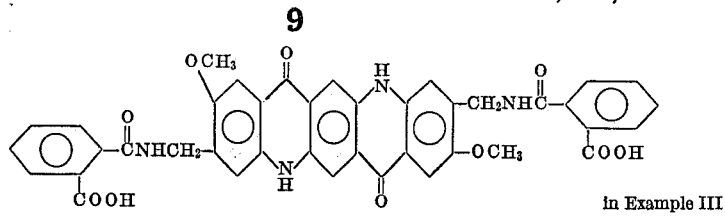
in Example III
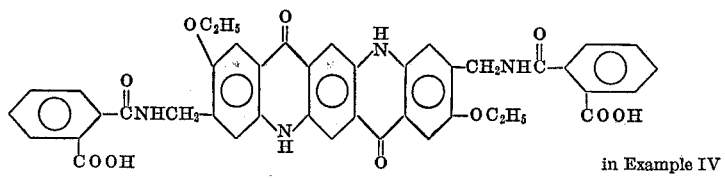
in Example IV
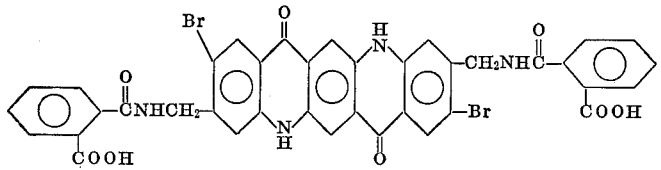
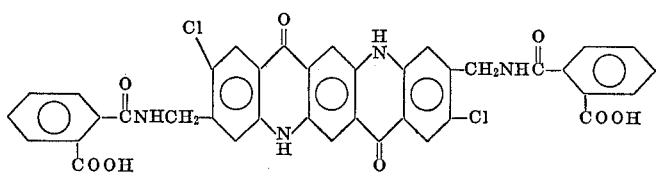
In each instance (Examples II–VI) there results magenta-colored pigments. Upon chemical analysis the resulting pigments were found to have the following formulas:
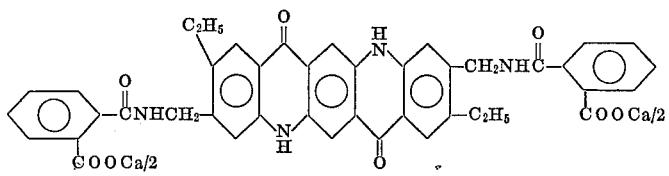
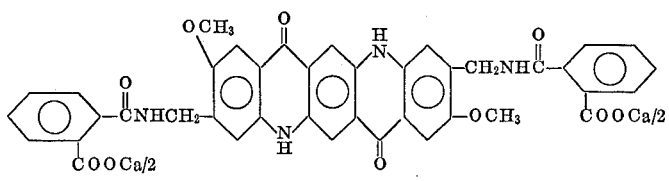
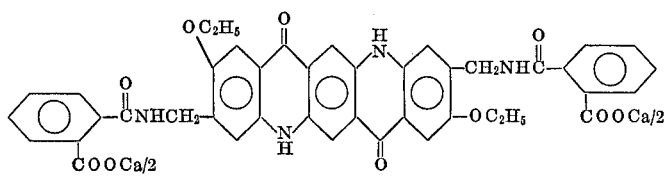
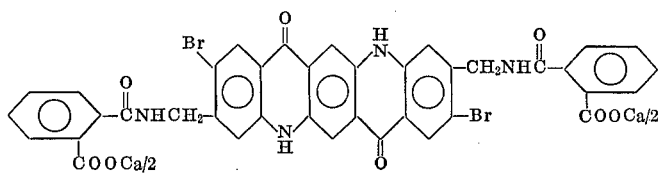
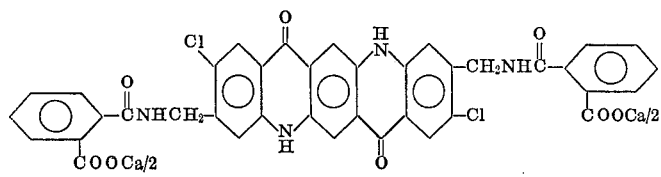

EXAMPLE VII

About 0.1 mole of

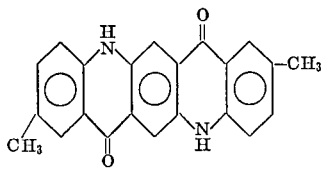

are placed in a 500 ml. glass beaker containing about 160 ml. of concentrated $H_2SO_4$. The mixture is cooled to about 35° C., at which time approximately 0.2 mole of

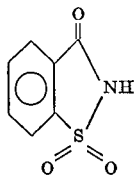

are added. The resulting mixture is stirred for about 10 minutes. Then about 0.2 mole of $CH_2O$ are added to the mixture. The mixture is heated to about 65° C., stirred for about 30 minutes and poured over ice. The resulting magenta pigment having the formula:

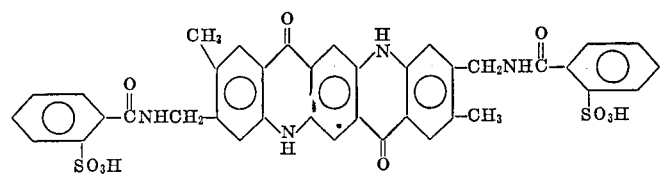

is filtered, washed with acetone, and dried.

EXAMPLES VIII–X

The procedure of Example VII is repeated using 0.1 mole of the following starting materials in place of

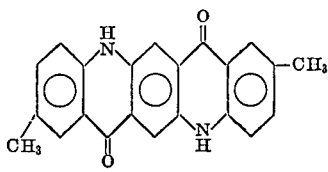

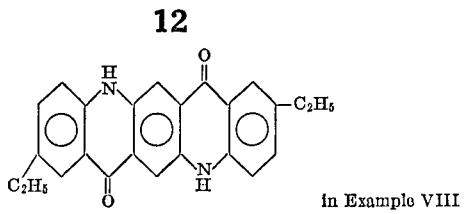

in Example VIII

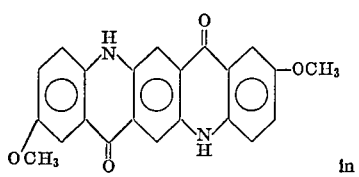

in Example IX

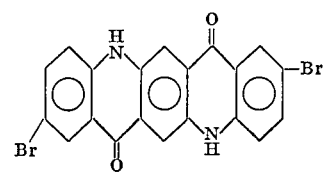

in Example X

In each instance (Examples VIII–X) there resulted magenta-colored pigments. Upon chemical analysis the resulting pigments were found to have the following formulas:

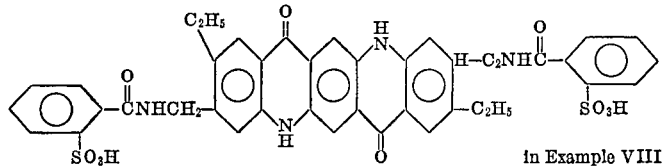

in Example VIII

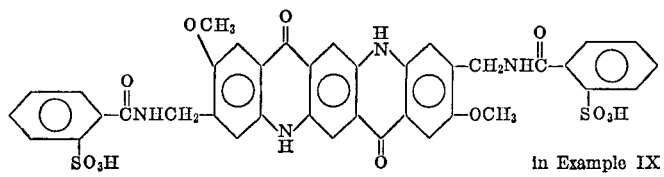

in Example IX

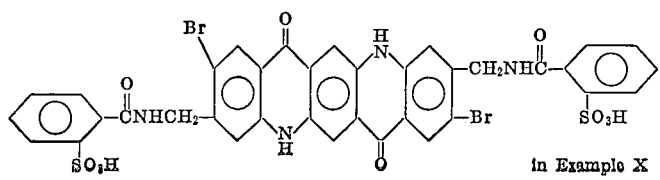

in Example X

EXAMPLES XI–XII

Examples of I and V are repeated using 0.002 mole each of

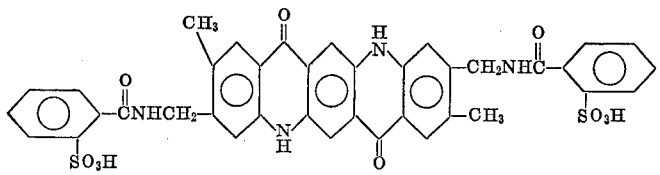

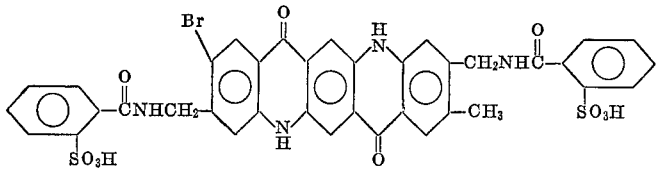

respectively, in place of

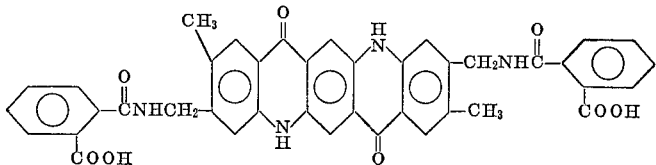

and

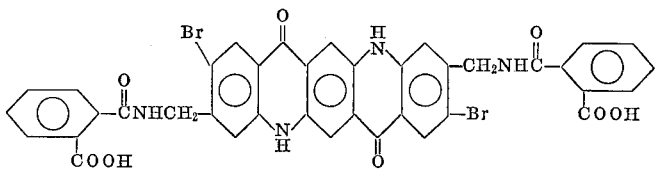

In both Examples XI and XII there resulted very brilliant magenta-colored pigments. Upon chemical analysis the resulting pigments were found to have the following formulas:

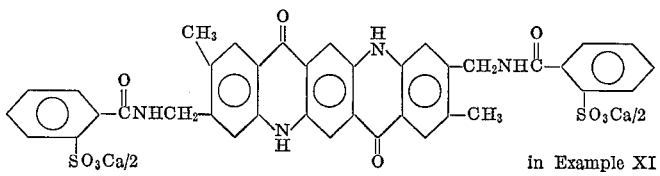

and

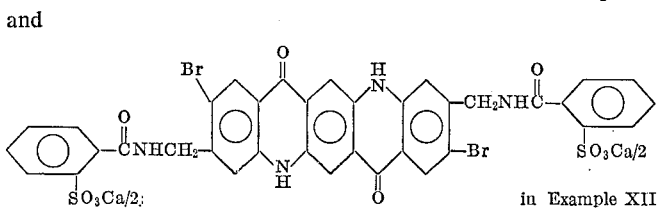

EXAMPLES XIII–XIV

About 4 parts of the novel magenta quinacridone pigment of Example I are suspended in about 100 parts of Sohio Odorless Solvent 3440, a kerosene fraction available from Standard Oil of Ohio. In Example XIII the mixture is coated on the NESA glass substrate and a negative potential is imposed on the roller electrode. Four exposure tests are made through neutral density step wedge filters and color filters as indicated above, to test the suspension for sensitivity to red, green, blue and white light. In Example XIV, the steps are repeated with the lower electrode at a positive potential. These novel magenta pigments are found to be primarily sensitive to green light with white light sensitivity being substantially the same as the green light sensitivity.

EXAMPLES XV–XVI

The pigment prepared in Example X is suspended and tested as in Examples XIII and XIV above. Results indicate that this novel quinacridone magenta pigment has good photographic speed and good density characteristics.

EXAMPLES XVII AND XVIII

The pigment of Example XI is suspended and tested as in Examples XIII and XIV. This pigment demonstrates excellent photographic speed and produces an image of excellent density.

EXAMPLES XIX AND X

The pigment of Examples XII is suspended and tested as in Examples XIII and XIV. The novel pigment is found to have excellent photographic speed and produces images of excellent density.

EXAMPLES XXI AND XXII

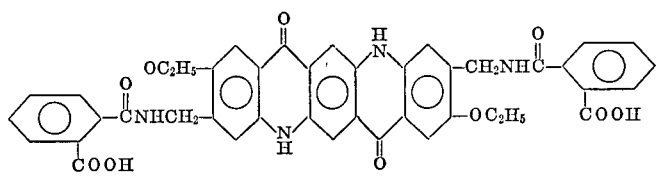

is suspended and treated as in Examples XIII and XIV. This pigment is found to have good photographic speed to produce good images with either a negative or positive potential on the roller electrode.

As shown by the above examples the novel class of quinacridone, of the present invention, in general, are suitable for use in electrophoretic imaging processes. Since their photographic speed, density characteristics and color characteristics vary, a mixture of the particular pigments may be preferred for specific uses. Some characteristics of the pigments may be improved by particular purification proceses, recrystallization processes and dye sensitization.

Although specific components and proportions have been described in the above examples, other suitable materials, as listed above, may be used with similar results. In addition, other materials may be added to the pigment compositions to synergize, enhance, or otherwise modify their properties. The novel pigment compositions of this invention may be dye sensitized, if desired, or may be mixed with other photosensitive materials, both organic and inorganic.

While the invention has been described in detail with respect to various preferred embodiments thereof it is not intended to be limited thereto but rather it will be appreciated by those skilled in the art that variations and modifications are possible which are within the spirit of this invention and the scope of the claims.

What is claimed is:

1. Quinacridone pigments having the formula:

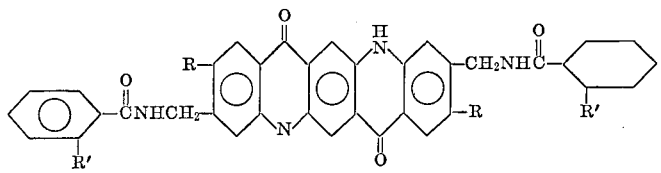

wherein R is selected from the group consisting of $CH_3$, $C_2H_5$, $OCH_3$, $OC_2H_5$, a halogen, and mixtures thereof and wherein R' is selected from the group consisting of $SO_3H$ and $SO_3Ca/2$.

2. The pigment of claim 1 wherein R is selected from th egroup consisting of $CH_3$, $C_2H-$, and mixtures thereof.

3. The pigments of claim 1 wherein R' is $SO_3Ca/2$.

References Cited

UNITED STATES PATENTS

| | | | |
|---|---|---|---|
| 3,275,637 | 9/1966 | West | 260—279 |
| 3,386,843 | 6/1968 | Jaffe | 260—279 X |
| 3,473,940 | 10/1969 | Walsh | 106—288 X |

FOREIGN PATENTS

| | | | |
|---|---|---|---|
| 179,404 | 8/1966 | U.S.S.R. | 260—279 |

DONALD G. DAUS, Primary Examiner

PO-1050
(5/69)

UNITED STATES PATENT OFFICE
CERTIFICATE OF CORRECTION

Patent No. __3,635,981__  Dated __January 18, 1972__

Inventor(s) __Lester Weinberger__

It is certified that error appears in the above-identified patent and that said Letters Patent are hereby corrected as shown below:

Column 3, Line 6 "if" should read ---of---.
Column 3, Line 22 "an" should read ---any---.
Column 3, that portion of the penultimate formula reading "COOCa/2" should read ---COOH---.
Column 4, Line 12 "CH$_2$" should read ---CH$_2$O---.
Column 5, that portion of the formula reading

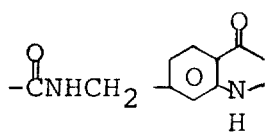   should read   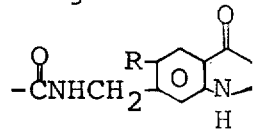

Column 9, after the third formula, insert ---in Example V---; after the fourth formula, insert ---in Example VI---; after the fifth formula, insert ---in Example II---; after the sixth formula, insert ---in Example III---; after the seventh formula, insert ---in Example IV---; after the eighth formula, insert ---in Example V---; after the ninth formula, insert ---in Example VI---.

Column 13, that portion of the second formula reading "CH$_3$" should read ---Br---.
Column 16, that portion of the formula reading

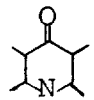   should read   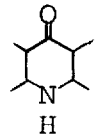

Column 16, Line 33, "C$_2$H-" should read ---C$_2$H$_5$---.

Signed and sealed this 13th day of March 1973.

(SEAL)
Attest:

EDWARD M.FLETCHER,JR.
Attesting Officer

ROBERT GOTTSCHALK
Commissioner of Patents